United States Patent [19]

Weightman et al.

[11] Patent Number: 4,741,574

[45] Date of Patent: May 3, 1988

[54] SEAT BELT COVER AND CUSHION

[76] Inventors: Judy M. Weightman; Andrew K. Mirikitani, both of 1717 Mott-Smith Dr., No. 1501, Honolulu, Hi. 96822

[21] Appl. No.: 753,924

[22] Filed: Jul. 11, 1985

[51] Int. Cl.⁴ .............................................. B60R 21/00
[52] U.S. Cl. .................... 297/482; 280/733; 280/801
[58] Field of Search ............... 280/801, 808, 807, 733, 280/802; 297/482, 488

[56] References Cited

U.S. PATENT DOCUMENTS

| | | | |
|---|---|---|---|
| 3,279,817 | 10/1966 | Henry | 297/488 |
| 3,306,662 | 2/1967 | Finnigan | 297/482 |
| 3,397,913 | 8/1968 | Fein | 297/482 |
| 3,957,282 | 5/1976 | Finnigan | 297/482 |
| 4,348,037 | 9/1982 | Law et al. | 297/483 |

FOREIGN PATENT DOCUMENTS

| | | |
|---|---|---|
| 2641852 | 3/1978 | Fed. Rep. of Germany . |
| 2838821 | 3/1980 | Fed. Rep. of Germany . |
| 2931339 | 2/1981 | Fed. Rep. of Germany . |
| 1368324 | 6/1964 | France ................................ 297/482 |
| 2436608 | 4/1980 | France . |
| 2524810 | 10/1983 | France . |
| 2530208 | 1/1984 | France . |
| 2048651 | 12/1980 | United Kingdom ................ 297/482 |
| 1581996 | 12/1980 | United Kingdom ................ 297/482 |

Primary Examiner—Richard A. Bertsch
Attorney, Agent, or Firm—James Creighton Wray

[57] ABSTRACT

A decorative cover for an automotive seat belt. The cover has a flexible and supple panel and a decorative outer surface. The long edges of the panel have fastening means of microhook and microloop fasteners. One of the fasteners is positioned slightly inward from the longitudinal edge of the panel such that when the panel is folded around an automotive seat belt a portion of the longitudinal edge extends beyond the fastener means. A plurality of slits are provided along the panel to facilitate movement of the panel along a seat belt.

9 Claims, 2 Drawing Sheets

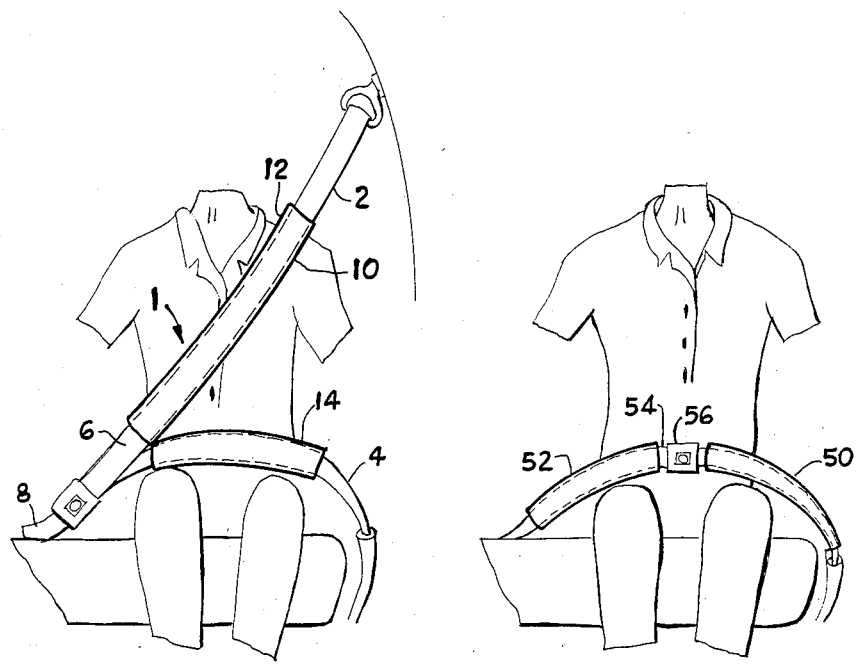
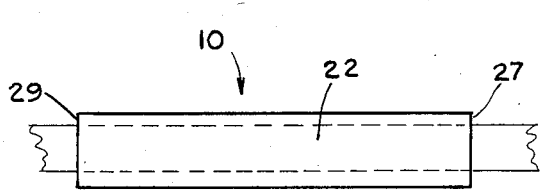
FIG. 3
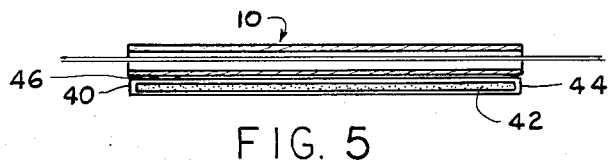
FIG. 5
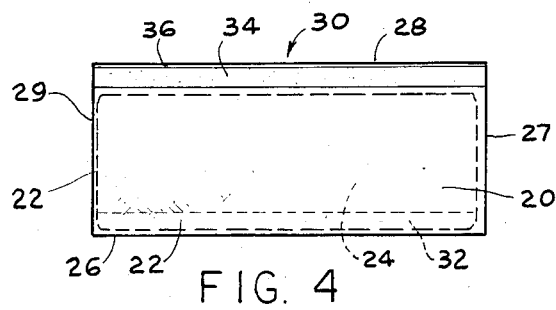
FIG. 4

SEAT BELT COVER AND CUSHION

BACKGROUND OF THE INVENTION

This invention concerns seat belt covers and pads. Four states, and all of Canada, now require that seat belts be worn while driving. It is probable that Hawaii will be the next state to require the wearing of seatbelts. Many motorists and passengers complain about the wearing of seatbelts for two reasons: (1) Seat belts are uncomfortable and (2) seat belts are not always very clean.

SUMMARY OF THE INVENTION

The invention provides clean and decorative wraps for automotive seat belts. Separate parts encase the lap belt and shoulder belt. Both parts wrap around the belt and close with VELCRO micro-hook and micro-loop closures. The wrap for the shoulder portion may hold a soft cushioning pad on the side which will face the wearer. Padding extends for the entire length of one face of the belt or is confined to surfaces facing the shoulder area and the waist area. The particular material ranges widely from strong nylon or denim to quilted cloth, fake fur, or sheepskin.

In the preferred form of the invention a plain rectangular decorative fabric panel has a hook or loop VELCRO strip along a longitudinal edge portion of one face and a complementary strip along the opposite edge portion of the opposite face. The strips may be discontinuous and may be constructed in spaced sections to save expense and to permit rapid or flexible fitting.

The present invention provides seat belt wraps to help make seat belt wearing delightful and stylish, thus, encouraging people to buckle-up for safety.

The seat belt wrap is an accessory which is attached to the two seat belt straps, the waist and shoulder portions on the newer cars and the two parts of the lap seat belt on the older cars. The seat belt wrap is made of different types of fabric to suit different styles. Each seat belt wrap includes two separate parts to encase each part of the seat belt. The fabric wraps around, e.g., the shoulder belt portion and closes with VELCRO fasteners. Each piece can be removed at any time for a washing or just to change for new fabric. Additionally, the shoulder portion of the seat belt contains a soft cushioning pad on the side of the strap which comes in contact with the shoulder and upper chest area. The seat belt strap, which wraps around the waist, also contains a cushioning pad on the side of the strap that rubs against the waist. Each piece of fabric or sleeve thus wraps around each strap of the seat belt and fastens with VELCRO strips, similar to the wallets that close with VELCRO strips. The pads can be removable as well. Padding can extend from the length of the belt or can be confined to the shoulder and waist areas. Users of the covers and pads are clean, comfortable and safe.

The invention is carried out with all types of fabrics, closures and padding. Some wraps have padding inserts wherever the belt touches the body. The invention includes personalized and designer belt wraps, a fashion accessory as well as a way to encourage people to use their seatbelts. The beltwraps range from nylon backpack type fabric to denim to quilted to kettlecloth to fake fur to sheepskin and more.

The invention furthers the social policy of the states, for example, Hawaii, and the country; saves lives as well as saves clothes; provides comfort with safety; and enables all to be beautifully buckled.

In the present seat belt wrap the padding is not an integral unit with the fabric. Padding is optional with the present product. The product does not have padding within a casing. The fabric is used independently of any padding. However, various sizes of shoulder pad type padding that can be attachable/detachable pieces are basically stick-on small pads. Padding, if used at all, is only on one side of the belt, the side against the wearer. The pad, if used, is stuck on to one side of the fabric wrap with a releaseable non-residue, reusable sticky substance such as produced by Creat O Matic, a Quebec company. Padding does not overlap the full belt.

The present invention is easy to use, thus it is likely to be used by the average driver and passenger. The main function of the invention is to provide a detachable fabric cover for easy cleaning so as to encourage seat belt use.

The invention provides a decorative cover apparatus for an automotive seat belt comprising an elongated rectangular fabric panel having inner and outer faces and having a decorative outer surface. The panel is flexible and supple. The panel has first and second generally parallel opposite relatively long edge portions and first and second opposite generally parallel relatively short edge portions respectively connecting complementary end portions of the opposite elongated edge portions. First fastener means extend along one long edge portion on a first surface of the panel and complementary second fastener means extend along a longitudinal edge portion of a second opposite surface of the panel, whereby after folding the panel around an automotive seat belt the first and second fastener means are juxtaposed and joined together to hold the fabric panel around the seat belt.

The preferred first and second fastener means respectively comprise complementary microhook and microloop fasteners.

Preferably the first fastener means is positioned directly along one edge portion on the first surface of the panel and the second fastener means is positioned on a longitudinal edge portion spaced slightly inward from the longitudinal edge of a second opposite surface of a panel, whereby after folding the panel around an automotive seat belt, a portion of the longitudinal edge, which extends beyond the second fastener means, also extends beyond a first fastener means in use so as to prevent unwanted contact with the first fastener means.

In one embodiment the decorative panel is precreased for folding around an automotive seat belt.

In one embodiment the first and second fastener means comprise releasable adhesive type fastener means, and the second fastener means comprises an edge portion of the panel which receives the releasable adhesive means.

The invention provides an elongated cushion for extending along an outer surface of a panel when the panel is wrapped around a seat belt and when the first and second fastener means are cooperatively secured. The cushion has means for attaching the cushion to the outer surface of the panel.

In one preferred embodiment the cushion comprises a foam block enclosed in a decorative covering. The means for attaching the cushion comprises means for cooperating with the outer surface of the decorative fabric panel of the cover apparatus.

The preferred means for attaching the cushion to the panel comprise a dry-type releasable fabric adhesive.

In one embodiment the first and second fastener means comprise a dry-type releasable adhesive.

The invention provides seat belt cover apparatus for an automotive seat belt comprising an elongated wrap-around fabric tube having open opposite longitudinal ends and having one longitudinally extending edge portion overlying another longitudinal portion of the wrap-around tube and fastener means connecting the said one longitudinal edge portion and the said other longitudinal portion of the wrap-around tube.

Preferably the fastener means comprises a first fastener means on the one longitudinal edge portion and a second complementary fastener on the other longitudinal portion.

Preferably the fastener means comprises complementary microhook and microloop fastener means respectively mounted on the one longitudinal edge portion and on the other longitudinal portion.

In one embodiment the fastener means comprises dry type fabric adhesive coating at least one of the longitudinal edge areas.

In one embodiment the dry type fabric adhesive is coated on both longitudinal edge areas.

Preferably a padding means is connected to the wrap-around tubular means. The padding means comprises an elongated generally flat foam insert and a fabric cover covering the foam insert and further comprise means for connecting the fabric cover to the wrap-around tube.

The preferred means for connecting the fabric cover to the wrap-around tube comprises a dry type fabric adhesive.

In the preferred embodiments first and second wrap-around tubes respectively connect to the shoulder belt and the waist belt portions of an automotive safety belt.

The invention provides a cushioned device for an automotive safety belt comprising an elongated cushion pad for extending along a seat belt, a fabric cover covering the pad, and a dry type releaseable adhesive along one outer surface area of the fabric cover for attaching the fabric cover and the cushioned device to a seat belt.

Preferably a wrap-around elongated flattened tube-like seat belt cover has a fastener means extending along one longitudinal edge of the wrap-around cover for attaching the longitudinal edge portion of the wrap around cover to another portion of the cover. The wrap-around tubular seat belt cover receives the dry type adhesive on the cushion for holding the cushion on the seat belt wrap-around cover.

These and other and further objects and features of the invention are apparent in the disclosure which includes the above and ongoing specification and the drawings.

BRIEF DESCRIPTION OF THE DRAWINGS

FIG. 1 represents a seat belt using the cover of the present invention on the shoulder and waist portions of the belt.

FIG. 2 shows an airplane belt or an old type automobile belt with a central buckle using the covers of the present invention on opposite halves of the belt.

FIG. 3 is a detail of the wrap-around tube.

FIG. 4 is a detail of the wrap-around tube laid flat.

FIG. 5 is a detail of the covered cushion pad adhesively secured to the seat belt cover.

DETAILED DESCRIPTION OF THE DRAWINGS

Figures 6, 7:
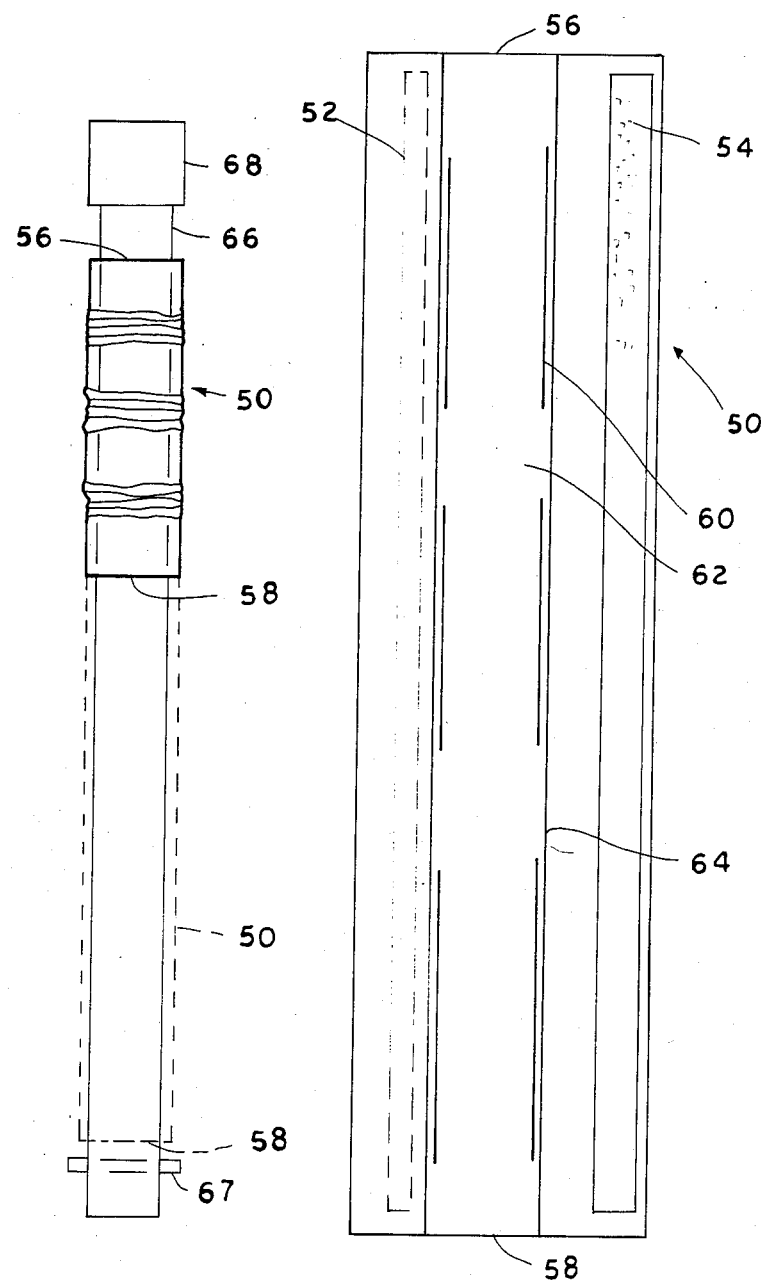
FIG. 6 is a detail of a slit cover.
FIG. 7 is a detail of a bunched cover ready for extending along a belt.

Referring to FIG. 1 an automotive type seat belt is generally referred to by the numeral 1. The seat belt has a shoulder portion 2 and a lap portion 4 which are joined together 6 near the buckle portion 8.

A wrap-around tubular decorative cover 10 is mounted on the shoulder portion to the seat belt. The decorative cover 10 has a portion 12 which extends above the shoulder of the wearer and which is brightly colored so that the presence or absence of the seat belt in use may be readily ascertained by those outside of the vehicle.

A tubular cover 14 similar to tubular cover 10 but substantially shorter surrounds the waist belt 4 in the area which overlies the lap of the user.

As shown in FIGS. 3 and 4 the wrap-around decorative cover 10 is made of a rectangular shape 20 of material having an outer face 22 and an inner face 24 and having first and second generally parallel opposite longitudinal edges 26 and 28, and opposite and parallel end edges 27 and 29. Fastener means 30 are mounted on the wrap-around sheet along the longitudinal edges thereof. A fastener means 32 is mounted along an edge 26 on inner face 24. A fastener 34 is mounted on outer surface 22 along edge 28.

In one embodiment of the invention, the fastener means 30 comprise cooperating microhook and microloop type fasteners. In a preferred embodiment, one of the fasteners on the overlapping edge is spaced slightly inward for a short distance 36 from edge 28 so that the edge 36 may be grasped without touching the fastener portion 34 and so that the fastener portion 34 and fastener portion 32 are fully covered so they do not come in contact with clothing. Preferably fastener 32 has loops and fastener 34 has hooks.

In a preferred embodiment of the invention, a pad 40 made of a long thin foam cushion block 42 encased in a cover 44 is attached to an outer surface 22 of the belt cover 10. In a preferred embodiment the cushion 40 is attached by a dry type fabric adhesive 46 such as a pressure sensitive adhesive which remains firmly attached to one portion of the cover 44 while releaseably attaching the cover 44 of the pad 40 to the outer surface 22 of the cover 10. The adhesive is any suitable adhesive such as a dry type self sticking adhesive such as those used on pads attached to clothing which may be removed without damaging the clothing.

Examples of such adhesives are used in attaching pads inside shoulder and arm areas and in underclothing. Adhesive pads may be used with or without the decorative covers but are preferably used with the covers. The invention is suitable for use with airline belts in which two covers 50 and 52 are wrapped around opposite portions of a belt 54 with a center buckle 56.

When the seatbelt cover is used with a retractable belt the supple fabric slides along the belt and bunches together as the belt is retracted. When or after the belt is extended, the fabric is slid along the belt by hand to restore it to a substantially full cover.

In one preferred embodiment as shown in FIG. 6, a cover 50 has fastener areas 52 and 54 and short end edges 56 and 58. Slits 60 spaced by solid areas 62 are provided near or at creases 64 to facilitate sliding and bunching of the cover. When the belt 66 is re-extended as shown in FIG. 7, end 56 near buckle 68 is held in place by friction or by hand while the other end 58 is slid along the belt 66 toward bracket 67 to fully cover the belt, as shown in broken lines.

In one preferred embodiment, the dry-type, self-sticking and releaseable fabric adhesive is used as the fastening for the wrap-around tube. The tubes provide highly decorative bright and clean coverings which provide an awareness of seat belts both as a reminder to use the belts, and as an indication that the belts are in use. The wrap-around fabric tubes are easily removed from the seat belts and washed and returned to the seat belts. Numbers of decorative tubes may be sold in packages so that the fabric designs may be interchanged and so that the fabric covers may be removed, discarded and replaced inexpensively and without substantial effort.

The present invention overcomes problems in the prior art by encouraging and identifying seat belt usage and by providing fresh clean attractive seat belts which are acceptable to use and which will not damage, discolor, or soil clothing.

While the invention has been described with reference to specific embodiments, modifications and variations of the invention may be constructed without departing from the scope of the invention. The scope of the invention is defined in the following claims.

We claim:

1. A decorative cover apparatus for an automotive seat belt comprising a single elongated rectangular panel having inner and outer faces and having a decorative outer surface, the panel being flexible and supple, the panel having first and second generally parallel opposite relatively long edge portions and having first and second opposite generally parallel relatively short edge portions respectively connecting complementary end portions of the opposite elongated edge portions, first fastener means extending along and overlying one long edge portion on a first surface of the panel and complementary second fastener means extending along and overlying a long portion of a second opposite surface of the panel, whereby after folding the panel around an automotive seat belt the first and second fastener means are juxtaposed and joined together to hold the fabric panel around the seat belt, wherein the first and second fastener means respectively comprise complementary microhook and microloop fasteners provided on opposite surfaces of the panel, wherein the first fastener means is positioned directly along one edge portion on the first surface of the panel and wherein the second fastener means is positioned on a longitudinal edge portion spaced slightly inward from the longitudinal edge of a second opposite surface of a panel, whereby after folding the panel around an automotive seat belt, a portion of the longitudinal edge, which extends beyond the second fastener means, also extends beyond a first fastener means in use so as to prevent unwanted contact with the first fastener means, and a plurality of slits provided longitudinally along the panel to facilitate movement of the panel along a seat belt.

2. The apparatus of claim 1 wherein the decorative panel is precreased for folding around an automotive seat belt.

3. The apparatus of claim 1 further comprising an elongated cushion for extending along an outer surface of the panel when the panel is wrapped around a seat belt and when the first and second fastener means are cooperatively secured, the cushion having means for attaching the cushion to the outer surface of the panel.

4. The apparatus of claim 3 wherein the cushion comprises a foam block enclosed in a decorative covering and wherein the means for attaching the cushion comprises means for cooperating with the outer surface of the decorative fabric panel of the cover apparatus.

5. The apparatus of claim 4 wherein the means for attaching the cushion to the panel comprises a dry-type releaseable fabric adhesive.

6. The apparatus of claim 1 wherein one of the first and second fastener means comprises a dry-type releasable adhesive.

7. The apparatus of claim 1 wherein the microhook fastener is provided on a surface opposite the decorative outer surface and the microloop fastener is provided on the decorative outer surface and wherein joining the complementary microhook and microloop fasteners provides a continuous curved decorative outer surface.

8. The apparatus of claim 1 further comprising
a plurality of slits provided longitudinally along the panel to facilitate movement of the panel along a seat belt.

9. The apparatus of claim 8 wherein the slits comprise three pairs of slits spaced along the panel.

* * * * *